June 13, 1967   R. M. ELLIOTT   3,324,700
PULLING CHUCK FOR RIVET SETTING TOOL
Filed Sept. 21, 1964   3 Sheets-Sheet 1
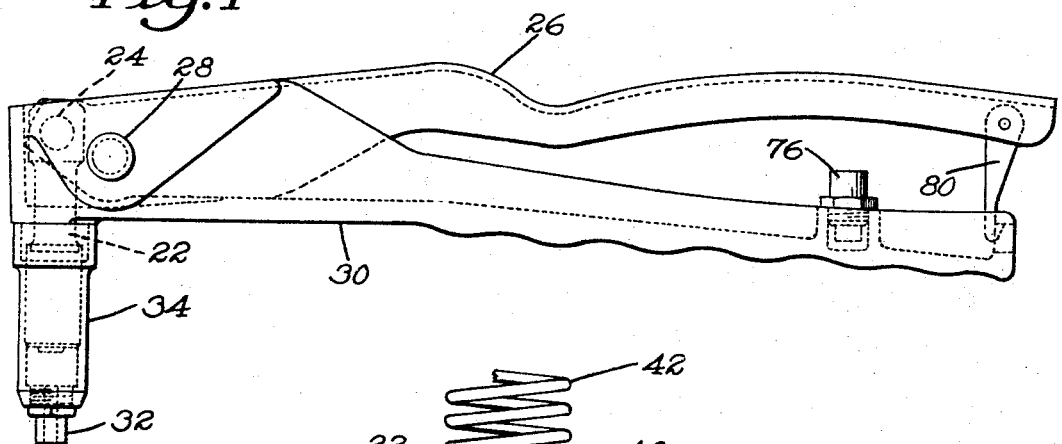
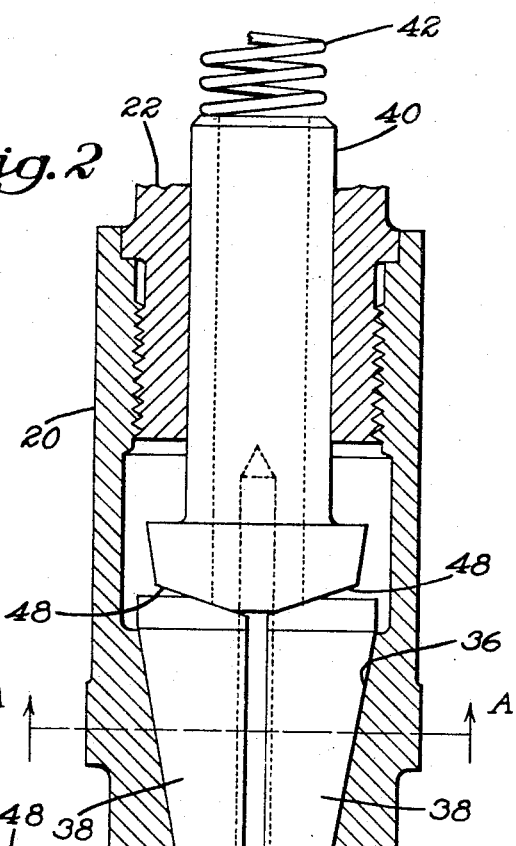
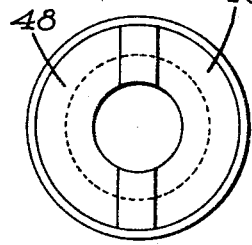
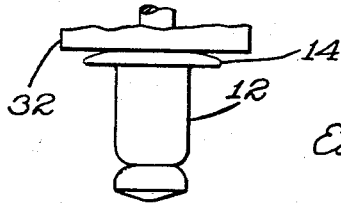
Inventor
Richard M. Elliott
By his Attorney
Edward W Fearing

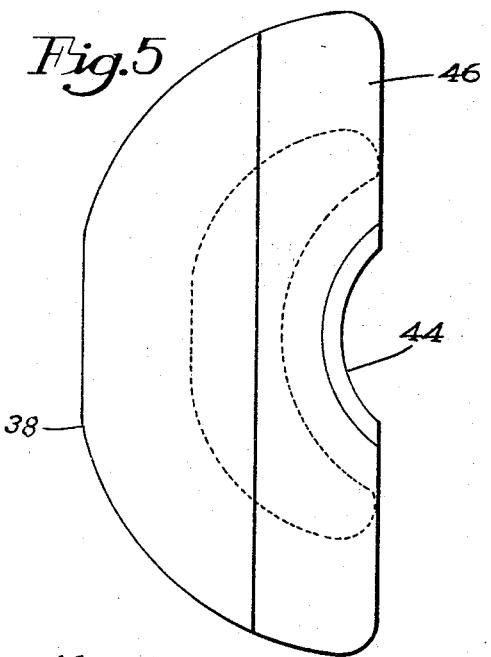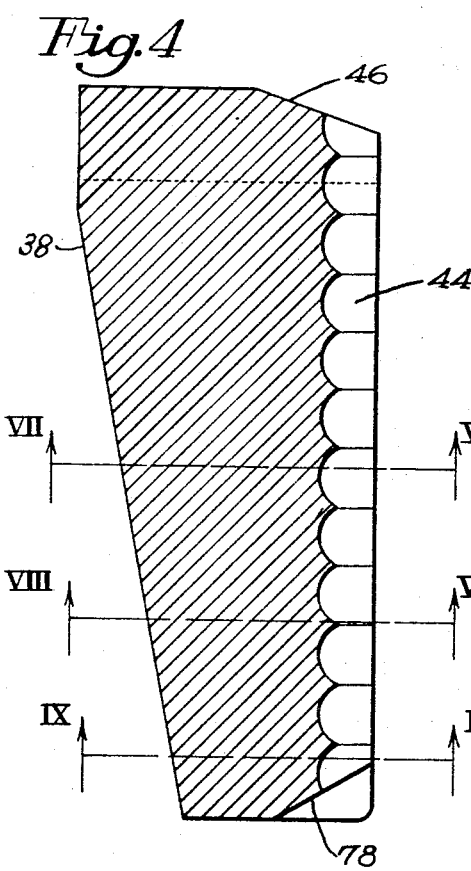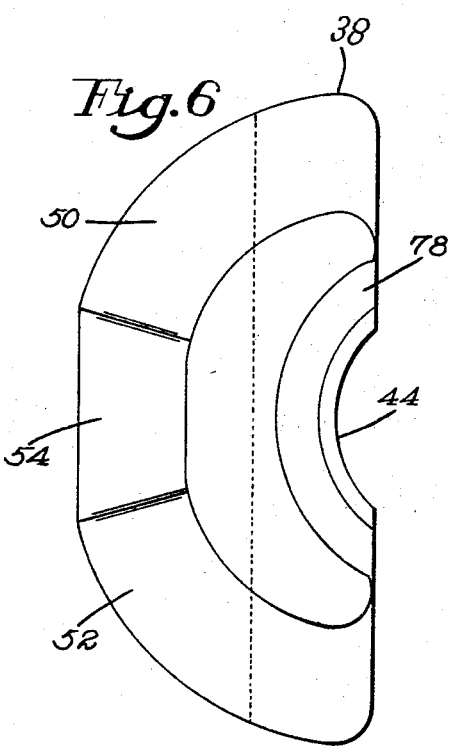

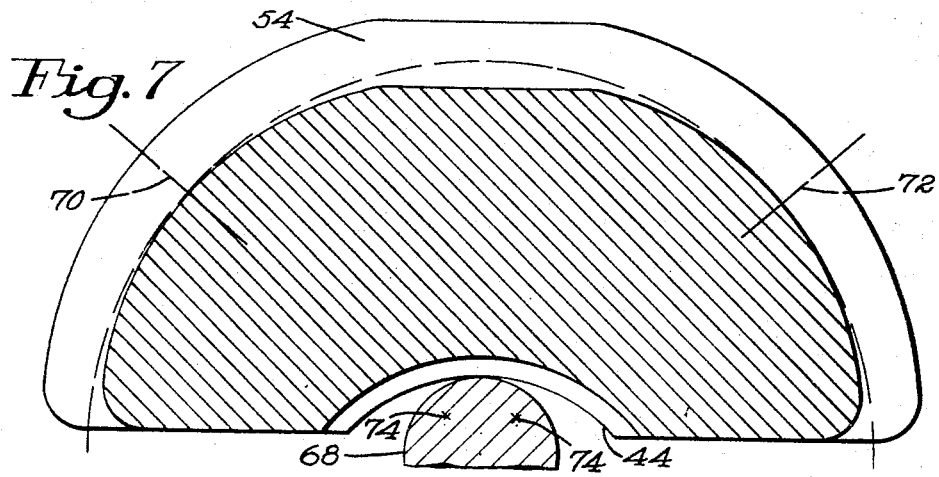
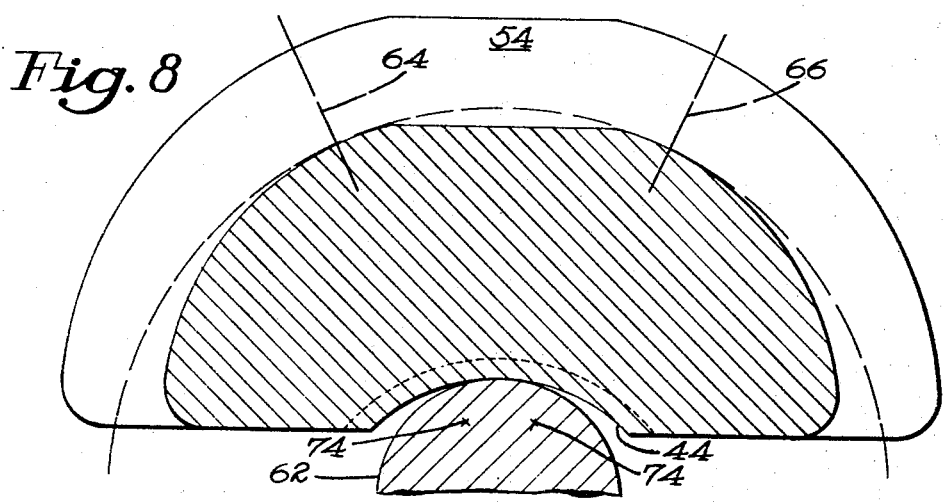
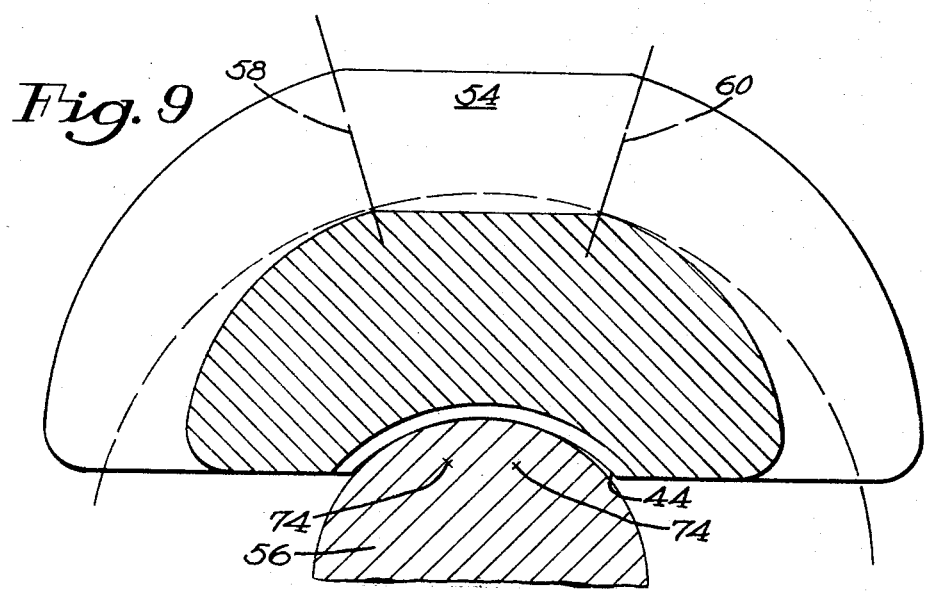

United States Patent Office 3,324,700
Patented June 13, 1967

3,324,700
PULLING CHUCK FOR RIVET SETTING TOOL
Richard M. Elliott, Beverly, Mass., assignor to United Shoe Machinery Corporation, Flemington, N.J., a corporation of New Jersey
Filed Sept. 21, 1964, Ser. No. 397,873
4 Claims. (Cl. 72—391)

This invention relates to chucks for pulling frangible mandrels such as are employed for setting blind rivets. More particularly, the invention relates to improvements in jaws for applying tension to the mandrels and for accentuating first the gripping action while setting a rivet and thereafter assisting the release of a broken portion of a rivet mandrel after setting is completed.

A mandrel pulling chuck differs from an ordinary machine tool chuck wherein the drill or shank of a cylindrical tool is grasped between a plurality of jaws primarily to resist rotation of the tool while it is being subjected to lengthwise pressure for forcing the tool into the work. For resisting rotation in a machine tool chuck while enabling tools of different diameter to be grasped with equal facility, the chuck paws are each formed with a tapered outer area comprising a portion of a conical surface, and a hollow case enclosing the jaws has an internal complete conical surface of corresponding shape, one or more springs acting to separate the jaws and hold them in contact with the inner conical surface of the jaw case. The radii of the internal conical surface in the jaw case and those for the outer area of the jaws are equal to each other when the jaws are pressed to the limit of their possible axial movement in the direction of the smallest dimension of the internal conical surface within the jaw case. When the jaws are separated to insert the shank of a tool between them, the outer surface of each jaw engages a conical surface of the jaw case having a much larger radius, so that each jaw engages the case along a single line intersecting its outer area. For this reason each jaw is capable of rocking movement within the jaw case. The actual thickness of each jaw is slightly less than the radii defining its outer tapered area, so that there is a tendency for the jaw to increase its gripping pressure on the tool shank with a self-energizing action whenever the rotational force of the tool causes rocking movement.

It must be appreciated that a machine tool, such as a drill or cutter, is made from hardened steel and that there can be no tendency to cut into the surface of a tool shank as the grip of a chuck jaw is increased in resisting rotational movement of the tool. In spite of the hardened shank of such tool, however, the rocking movement of the jaws in the jaw case may cause the chuck to be jammed and locked against easy release of the tool, and any attempt to use a chuck of this nature for rivet setting purposes would result in troublesome delay in releasing the separated portion of a rivet mandrel, particularly if the mandrel were composed of relatively soft easily deformable metal, such as commonly used for such purposes.

Also, because of the needs for resisting rotation of a machine tool and for avoiding difficulty in releasing it, it has been usual to provide three or more jaws in a tool chuck, each acting in a similar self-energizing manner to increase the gripping force exerted on a tool shank whenever resistance to relative rotation increases.

For a rivet setting chuck there ordinarily is no heavy rotational force exerted, so that more than two jaws are not required and actually are undesirable for the reason that rotational force may separate the jaws slightly in an irregular pattern while setting a rivet. It is therefore an object of the present invention to provide a simple rivet setting chuck for frangible mandrel rivets having but a single pair of jaws, which are supported in a stable manner within an enclosing case that the mandrel may be tensioned while drawing the jaws into a smaller diameter portion of the jaw case without imparting any rocking movement to the jaws. In this way the spacing between the jaws will remain uniform under the heaviest forces capable of being exerted on the mandrel, particularly when the jaws are provided with matched grooves having transverse corrugations for indenting a rivet mandrel while holding it against lengthwise movement.

A further object of the invention is to simplify and improve the construction of a mandrel setting chuck, so that a separated portion of a mandrel may be released easily from the chuck without any tendency to become jammed after being indented by corrugations within the gripping jaws.

The most elemental form of the feature of the invention is capable of being employed to advantage with a chuck provided with a pair of jaws, each having a flat side, a mandrel receiving groove at the center of the flat side, a tapered outer area generally concentric with the groove, and a plane face at the larger end inclined inwardly toward the smaller end of the jaw, with which is also incorporated a jaw actuating spring pressed plunger for actuating the jaws to grip a mandrel and having two similar plane faces supplemental to the angles of those on the jaws to insure equal spacing between adjacent side edges of the jaws as they are spread to receive a rivet mandrel. By this construction the jaws apply a straight, even pull on a rivet mandrel, providing maximum efficiency in transfer of gripping force to the mandrel and easy release of the mandrel from the jaws even though the jaws are sharply corrugated along their mandrel receiving grooves to form deep indentations in the mandrel.

In another feature of the invention the tapered outer area of each jaw is formed in two parts separated by an intermediate flat surface or at least constructed with a much larger radius of curvature than that on the tapered area and running lengthwise of the jaw approximately half way between the extreme edges of the tapered area.

These and other features of the invention, as hereinafter described and claimed, will readily be understood by those skilled in the art from the following detailed specification, taken in connection with the accompanying drawings, in which:

FIG. 1 is a view in side elevation of a tool embodying the features of the present invention;

FIG. 2 is an enlarged detail view, taken in cross section and foreshortened by breaking away an enclosing housing of a rivet gripping chuck employed in the tool of FIG. 1 with a rivet inserted therein to be applied to a workpiece;

FIG. 3 is a bottom plan detail view of a jaw separating plunger employed in the chuck;

FIG. 4 is a further enlarged sectional detail view of a jaw utilized in the chuck of FIG. 2;

FIG. 5 is a detail plan view of the upper end of the jaw illustrated in FIG. 4;

FIG. 6 is a bottom plan view of the lower end of the jaw;

FIG. 7 is a further enlarged sectional detail view of one of the chuck jaws as viewed from the line A—A of FIG. 2 and also the line VII—VII of FIG. 4, while gripping a small sized rivet mandrel;

FIG. 8 is a similar sectional view showing the use of a rivet mandrel of intermediate size which changes the lengthwise position of the jaw to bring the line VIII—VIII of FIG. 4 into coincidence with the section of the chuck nozzle defined by the line A—A of FIG. 2; and FIG. 9 is a similar sectional view showing the use of a large sized rivet mandrel which causes a further changed lengthwise position of the jaw to bring the line IX—IX of FIG. 4 into coincidence with the section of the chuck nozzle defined by the line A—A of FIG. 2.

The illustrative chuck is intended for use in a rivet setting tool having a nosepiece unit similar to that disclosed in United States Letters Patent No. 3,095,106, granted June 25, 1963 upon application of R. A. Morrison. While the tool of that patent is operated by a self-contained electric motor, the chuck of the present machine is also capable of advantageous use as a hand operated tool, such as disclosed in United States Letters Patent No. 3,154,210, granted Oct. 27, 1964 upon application of the present inventor and Raymond M. Tremblay.

The tool of the last-named patent, however, is capable of most effective use only with a single size of rivet, whereas the Morrison patent is capable of setting a variety of sizes and types of rivets by employing different nosepiece units, each unit being employed with a particular size or type of rivet and containing a separate chuck for gripping for each rivet mandrel, and an abutment means or anvil against which the rivet is set when the mandrel is tensioned.

The tool shown in the drawings avoids the necessity of changing complete nosepiece units for different sizes and types of rivets and requires only replacement of anvils the same gripping action on a rivet mandrel being obtained regardless of the diameter of the rivet mandrel operated upon, while replacement anvil alone takes care of any variation in the length and type of rivet, otherwise.

The type of rivet operated upon consists of a hollow barrel 12 provided with a flange 14 at one end and a headed mandrel passing through it, the head on the mandrel being employed to distend the diameter at the other end of the barrel by pulling the head into it until a weakened section in the mandrel permits it to separate and terminate the distention of the barrel. The illustrated chuck is particularly useful when the tool is operated entirely by hand because of the limited power available, the chuck acting with great uniformity and reliability both in exerting a pull on the mandrel and in avoiding the possibility of slippage or resultant abuse of the mandrel in a manner to strip chunks or slivers from its side surfaces.

The chuck shown in the drawings is similar to that of the prior patent in that it is provided with a jaw case 20 threadedly connected to the outer end of a slide 22, the upper end of which is pivotally connected at 24 to a handle 26 fulcrumed at 28 on a frame 30 forming a second handle. To support the flanged end of the rivet against the pull on the mandrel, the abutment or anvil, indicated at 32, is replaceable by threading it into a tubular housing 34 within which the jaw case 20 is guided, the anvil being drilled with a perforation to fit the mandrel of the particular rivet utilized.

In the chuck of Patent No. 3,095,106 the jaw case has a frusto-conical internal surface, such as that indicated at 36 (FIG. 2), the smaller diameter end of which intersects the free end of the case. To grip the mandrel, the case encloses two flat sided collet jaws, similar to those shown at 38 having tapered outer areas corresponding in angle of inclination to the internal conical surface of the jaw case, the jaws acting to grip mandrels of different diameter by movement axially of the nozzle. To force the jaws into gripping relation with a mandrel, the larger ends of the jaws are engaged by an enlarged head of a hollow plunger, similar to that shown at 40 pressed yieldingly against the jaws by a coil spring, corresponding to the one illustrated at 42, loosely mounted within the slide and confined between the inner end of the plunger and a shoulder within the slide.

In the tool of Patent No. 3,095,106 the plunger and the larger ends of the jaws are formed with conical case engaging surfaces which tend to maintain the jaws in spread relation as they are forced inwardly of the surrounding jaw case. However, it has been found that when a mandrel of a rivet is forced between the jaws, they have a tendency to separate unequally along their side edges, the side edges of the jaws being moved together, while the other edges are separated excessively. As a result the initial grip of the jaws on a rivet mandrel is one-sided and insecure, tending to cause slippage and bending of the mandrel under tension, so that they do not release their grip effectively from a separated rivet mandrel and the parts of the chuck within the nozzle may become clogged rapidly with metallic particles torn off from the sides of the mandrel.

The jaws of the present chuck are separated equally along their side edges when a rivet mandrel is inserted between them, so that a uniform balanced grip may be obtained. As in the prior chuck, each jaw of the pair has in its flat side a central mandrel receiving groove 44 (FIG. 4) with sharp edged corrugations extending transversely of the groove and the outer area of each jaw is tapered in a manner generally concentric with the groove 44. However, there is formed at the larger end of each jaw a plane face 46 inclined toward the smaller end of the jaw, as viewed from the outer surface toward the groove. Cooperating with the plane face 46 is one of two similar inclined plane faces 48 on the jaw actuating plunger 40, the angle of inclination on the faces 48 being supplemental to the faces 46 on the jaws.

The action of the plane faces 46 and 48 causes the jaws to be separated by equal amounts as they are pressed inwardly of the jaw case 20, so that they always engage the inner conical surface 36. If there is any tendency for one jaw to be rotated with respect to the other jaw greater pressure will be exerted by the face 48 on one edge of the jaw to bring its edges back into equally spaced relationship. Thus the initial grip of the jaws when tensioning a mandrel will always cause balanced pressures to be exerted diametrically of the jaw case, 180° apart without any tendency for the mandrel to move into an eccentric position in the chuck.

To insure that the balanced grip of the jaws on a rivet mandrel will be continued while a rivet setting pull is exerted, causing the sharpened edges of the corrugations in the groove 44 to become embedded to some extent below the surface of the mandrel while the jaws slide axially in the jaw case, thus providing an increased grip on the mandrel, in the illustrated form of this feature the tapered outer area of each jaw is formed in two parts, indicated at 50 and 52, as shown in FIG. 6. The parts 50 and 52 are separated by an intermediate curved area or stripe 54, the radius of which is much larger than the maximum radius of either area part 50 or 52. Under some conditions it may be found desirable to make the intermediate stripe 54 flat (as shown) or even concave, so that there is no possibility of engagement between the outer area of the jaw along this stripe and the inner conical surface 36 of the jaw case. By this construction a stable support on the inner conical surface 36 is maintained without possibility of rocking action of the jaws to unbalance their grip on a rivet mandrel, as may occur with the use of prior chuck jaws.

With prior chuck jaws their outer surfaces are wholly frustoconical, corresponding to that of the jaw case. When drawn to their maximum gripping position the prior jaws conform exactly with the inner conical surface of the jaw case. If a rivet mandrel is inserted between the jaws they are forced apart and inwardly of the jaw case, so that they each engage it along a line determined by the points of tangency between a given diameter of the conical surface in the jaw cases, the areas of both jaws having smaller radii of curvature to engage jaw case surfaces of much larger radii of curvature. Thus, the action of each jaw in indenting a rivet mandrel presents a somewhat unstable relationship, in which pressure is exerted diametrically along points of tangency between two pairs of poorly fitted surfaces, the points of maximum pressure for each diameter along the inner conical surface of the jaw case acting along a single straight line intersecting the tapered outer area of each jaw.

With the present construction, each jaw has two spaced lines of support connecting two points of tangency along either part of the jaw area for any given diameter of the jaw case. For instance, with a large rivet mandrel, such as shown at 56 in FIG. 9, the points of tangency lie along two spaced lines 58 and 60 at the outer area on a jaw rather than along a single line of contact as on the prior jaw. With an intermediate size of rivet mandrel 62 the points of tangency lie along lines 64 and 66, as in FIG. 8, spaced further apart than those shown in FIG. 9. With the smallest size of rivet mandrel 68 the points of tangency 70 and 72 for each diameter of inner jaw case surface are spaced further apart, as in FIG. 7, thus giving the greatest degree of stability to each jaw in its support offered by the jaw case the force exerted on the mandrel by the jaw being given the broadest base.

It will be noted that with the largest sized rivet mandrel 56 the points of tangency between the jaw and the jaw case appear approximately as the boundaries of the intermediate area which boundaries are spaced sufficiently to prevent a single point of contact between the jaw and the jaw case for any given diameter of case surface.

In order to cause the lines of contact between each jaw and the jaw case to have greater spacing between them for smaller sizes of rivet mandrels, as in FIGS. 7 and 8 the two side parts of the tapered area on a jaw have similar radii of curvature centered at cross marks 74, between the outer edges of the flat side of each jaw and the center of the groove in the jaw, the radii of the curved areas always being less than that of the jaw case at each point engaged by the jaw, as shown in FIGS. 7, 8 and 9.

To enable convenient insertion of each size of rivet mandrel and the fullest possible movement of the chuck to be employed in setting the rivet, correspondingly different anvils are employed. The anvil 32 shown in FIG. 1 is intended for use with an intermediate size of rivet and an anvil 76 removably inserted in a threaded opening in the frame 30 is intended for use with the largest sized rivet mandrel. A separate small sized anvil (not shown) also may be used for the smallest size of mandrel, if required.

Each anvil is formed with a passage of a diameter fitting the particular mandrel intended for it, while enabling easy sliding movement for the mandrel. Each anvil also is formed with a conical end projecting inwardly of the frame 30 to enable the chuck jaws to be separated a distance required to receive the mandrel without excessive looseness. Opening movement of the jaws to receive a mandrel is afforded by swinging the handle 26 as far as possible away from the frame 30, thus forcing a conical surface 78 (see FIGS. 4 and 6) on the jaws against the inwardly projecting conical surface of the selected anvil. To assist in holding the handle 26 at the limit of its movement toward the housing 30 when the tool is not in use the outer free end of the handle has pivotally attached to it a latch 80 arranged to engage a depression in the housing.

The nature and scope of the invention having been indicated and a particular embodiment having been described, what is claimed is:

1. A mandrel pulling chuck for frangible mandrel rivets comprising a hollow guide, a slide within the guide and a hollow jaw case attached to the slide and formed with an internal conical surface in combination with a pair of jaws each having a mandrel receiving groove, a tapered outer area generally concentric with the groove and a flat face lying in a plane at its larger end inclined toward the smaller end of the jaw in passing from the outer surface to the groove and a spring-pressed jaw actuating plunger having two similar plane faces supplemental to the angles of those on the jaws to insure equal spacing between adjacent edges of the jaws as they are spread to receive a rivet mandrel.

2. A mandrel pulling chuck for frangible mandrel rivets comprising a hollow guide, a slide within the guide and a hollow jaw case attached to the slide and formed with an internal conical surface, in combination with a pair of spring actuated flat sided jaws, each jaw having a mandrel receiving groove in its flat side and a two-part outer area generally concentric with the groove, each outer area part being separated from the other by an intermediate, relatively flatter area running lengthwise of each jaw approximately half way between the extreme edges of its flat side whereby two spaced apart lines of contact are established between each jaw and the interior conical surface, a line of contact on each jaw being located in each outer area at each side of the intermediate relatively flatter area while gripping mandrels of different diameters within a permissible range of mandrel diameters.

3. A chuck, as in claim 2, in which the intermediate area comprises at least in part a flat central plane merging with the two side part areas to insure equal distribution of pressure on each outer area part of the jaws during gripping action on a mandrel.

4. A chuck, as in claim 2, in which each jaw has a plane face at its larger end inclined toward the smaller end of the jaw in passing from the outer surface to the groove and there is provided a spring actuated plunger having two similar plane faces supplemental to the angles of those on the jaws to insure equal spacing between adjacent edges of the jaws as they are spread to receive a rivet mandrel.

References Cited

UNITED STATES PATENTS

| 2,845,197 | 7/1958 | Newstead | 72—413 |
| 3,002,644 | 10/1961 | Meyer | 72—391 |
| 3,082,898 | 3/1963 | Bosch | 72—391 |
| 3,088,618 | 5/1963 | Pickford | 72—391 |
| 3,095,106 | 6/1963 | Morrison | 72—391 |
| 3,101,858 | 7/1963 | Brewer | 72—391 |
| 3,144,158 | 7/1964 | Noubelet | 72—391 |

FOREIGN PATENTS

| 800,427 | 7/1958 | Great Britain. |

CHARLES W. LANHAM, *Primary Examiner.*

G. CROSBY, *Assistant Examiner.*